United States Patent

Casimaty et al.

[11] Patent Number: 5,525,012
[45] Date of Patent: Jun. 11, 1996

[54] APPARATUS FOR INSERTING NETTING INTO A GROUND SURFACE AND METHOD FOR ACCOMPLISHING SAME

[76] Inventors: Gabriel Casimaty, Tallarook Park, School House Lane, Seymour, 3660, Victoria; Geoffrey R. Osborne, 121 Lagoon Grove, Yanchep, 6035, Western Australia, both of Australia

[21] Appl. No.: 362,502

[22] PCT Filed: Jul. 2, 1993

[86] PCT No.: PCT/AU93/00328

§ 371 Date: Feb. 13, 1995

§ 102(e) Date: Feb. 13, 1995

[87] PCT Pub. No.: WO94/00974

PCT Pub. Date: Jan. 20, 1994

[30] Foreign Application Priority Data

Jul. 3, 1992 [AU] Australia ............... PL3313

[51] Int. Cl.⁶ ............... A01B 29/04; A01G 1/12
[52] U.S. Cl. ............... 405/258; 111/901
[58] Field of Search ............... 405/128, 258; 111/199, 901, 902; 172/40; 47/56

[56] References Cited

U.S. PATENT DOCUMENTS 1,592,250  7/1926  Yerkes ............... 111/901 X
3,905,313  9/1975  Grether ............... 47/56 X
4,175,496  11/1979  Rehbein ............... 111/901 X

FOREIGN PATENT DOCUMENTS 214239   10/1956  Australia.
5914480  12/1980  Australia.
6366490   4/1991  Australia.
0195760   9/1986  European Pat. Off..
2113320  10/1972  Germany ............... 172/40

Primary Examiner—David J. Bagnell
Attorney, Agent, or Firm—Edwin D. Schindler

[57] ABSTRACT

An apparatus and method for inserting netting into a ground surface is provided. The apparatus includes a frame adapted to be connected to a prime mover and having a roller transverse to the direction of normal movement of the frame. The roller has spaced annular extensions thereabout, the roller limiting the depth of entry into the ground of the extensions to the radius of the annulus formed by the extensions. The apparatus further includes a vibrator associated with the roller causing the roller to vibrate. The extensions able to effectively fluidize the ground surface so that the netting fed to the underside of the roller can be located in or under the ground surface by pressure from the extensions while the ground is fluidized. The apparatus may be used with a prime mover by mounting the apparatus on a rear portion thereof and by including a material delivery device located on the prime mover.

13 Claims, 2 Drawing Sheets

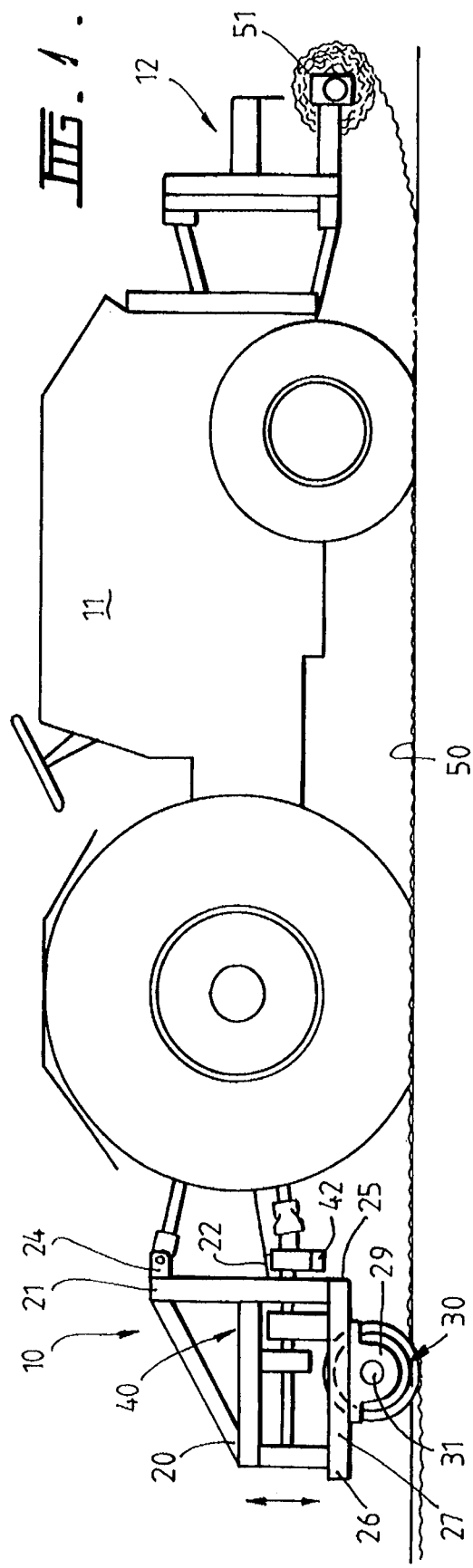

APPARATUS FOR INSERTING NETTING INTO A GROUND SURFACE AND METHOD FOR ACCOMPLISHING SAME

This invention relates to an apparatus for pressing netting to support turf and the like into the ground surface and is also applicable to the location of small net elements in the ground surface and also the laying of stolons into the soil surface.

Turf netting may be laid on the ground surface where turf is to be sown so as to stabilise the surface and prevent the movement of the top soil by wind and the like and, normally, to locate such netting, it is necessary to remove the netting from a roll and to peg it or otherwise physically connect it to the surface to prevent movement thereof.

This arrangement, whilst quite satisfactory practically, is nevertheless labour intensive and thus time consuming and costly.

It is also desirable when stolons are to be planted that these be located into the soil surface and, again, this is a labour intensive, time consuming and a somewhat difficult procedure.

Also there are applications when small mesh elements such as those sold as Netlon (registered trade mark) mesh elements are to be located in a surface, such as a sand surface.

These elements are normally located before the laying of sod, particularly washed sod, to provide a consolidated surface onto which the sod grows.

This is particularly useful in such areas as, say, racecourses and the like where the turf, when established, is likely to be cut and moved by horses' hooves.

It is the object of the present invention to provide an apparatus which will locate netting an other materials automatically and accurately.

The invention, in its broadest sense, provides an apparatus to insert netting or other articles into the ground surface which includes a frame adapted to be connected to a prime mover and having a roller transverse to the direction of normal movement of the frame, the roller having spaced annular extensions thereabout, the roller limiting the depth of entry into the ground of the extensions to the radius of the annulus formed by the extensions, and vibration means associated with the roller which caused the roller to vibrate, the extensions being capable of effectively fluidising the ground surface so that the netting or other article fed to the underside of the roller can be located in or under the ground surface by pressure from the discs whilst the ground is fluidised.

In one aspect the invention is used to locate turf netting into the ground surface and the material to be located by the roller is netting in a sheet form which is fed to the underside of the roller.

The frame may be adapted to be connected to the three point linkage of a tractor, and the vibrating means, may be powered from the power take off of the tractor.

The netting tan be delivered from a carrier mounted, either forwardly of the apparatus of the invention, or on the front of the prime mover.

The apparatus is also useful for locating solons on or in the ground surface and again these are fed to the forward side of the roller and, further the apparatus can be used for locating Netlon mesh elements into a prepared surface before the laying of washed turf.

The invention also provides a method of inserting a mesh or the like into the ground surface comprising passing the mesh beneath a roller transverse to the direction of normal movement of a prime mover, the roller having spaced annular extensions thereabout, the roller limiting the depth of entry into the ground of the extensions to the radius of the annulus formed by the extensions, vibrating the roller to cause the extensions to effectively fluidise the ground surface so that material fed beneath the roller is located in or under the ground surface by downward pressure from the discs whilst the ground is fluidised.

In order that the invention may be more readily understood, we shall describe, in relation to the accompanying drawings, one particular embodiment of device made in accordance with the invention.

In these drawings:

FIG. 1 shows a side view of a prime mover, being a tractor, having the apparatus of the invention attached to its linkage and power take off and a feeder attached to the forward end thereof;

Figure 4:
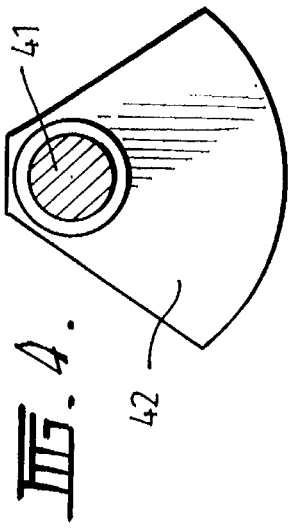
FIG. 4 is a front view of the eccentric weight which causes the vibration and as shown in FIG. 2.
Figure 3:
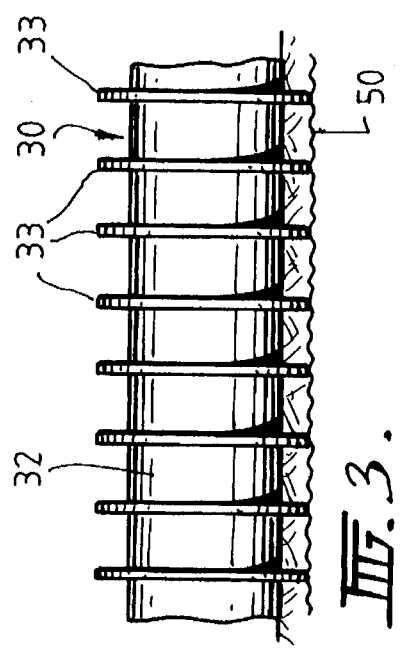
FIG. 3 is a view showing the location of the roller relative to the ground surface when laying mesh.
Figure 2:
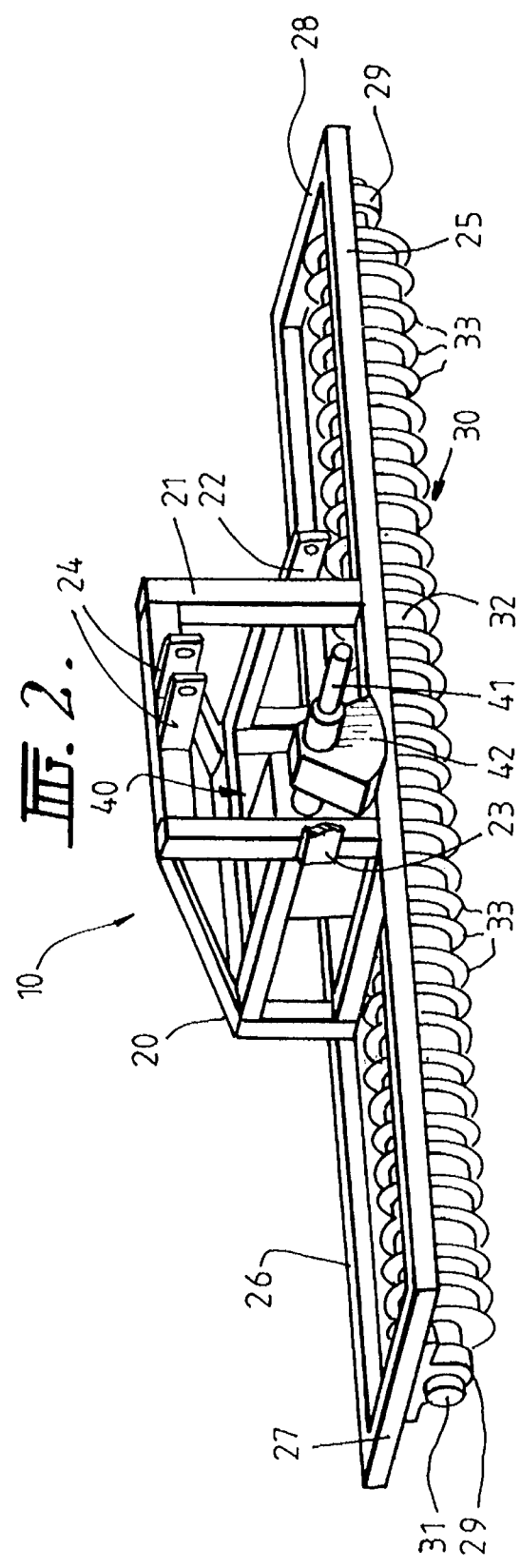
FIG. 2 is a perspective view of the apparatus of the invention separate from the prime mover.

The apparatus 10 a frame 20, which includes a forward portion 21 which extends upwardly, and is provided with connections 22, 23, 24 for a three point linkage.

It has a pair of spaced transverse members 25, 26, between which the roller 30 is to be located.

The transverse members 25, 26, are connected at the end by a pair of members 27, 28 which are provided with bearing journals 29 at each end to receive an axle 31 of the roller.

The roller has a cylindrical body 32, and has along its periphery, a number of evenly spaced annular extension 33, with the annular radial width of these being substantially equal to the depth at which the netting is to be located.

A preferred spacing of the discs could be of the order of between seventy five and one hundred and fifty millimeters, but this is not limiting.

Mounted for rotation on the frame and above the roller, there is a vibration device 40, which includes an input shaft 41 which has a rotatable out of balance mass 42 thereon, rotation of which provides the required vibration.

The input shaft is connectable to the power take off of the tractor each directly or through a gear box. The shaft 41 is journalled into the frame using bearings which can accept rapidly changing radial forces.

Vibrators per se are known, and a conventional vibrator can well be used.

The arrangement is such that, when the roller 30 is on the ground surface, normally under its own weight, but it could be under a downward pressure from the three point linkage, and the tractor is moved forwardly with the vibrator 40 in operation, the vibration, through the extension 33, will effectively fluidise the ground surface.

If, then, a plastic netting 50 is located beneath the roller, this mesh will be forced into the fluidised surface to approximately the depth of the extension 33, and, as the tractor moves forwardly, the surface material will consolidate, and the mesh will be positively located below the surface, and will be unable to move.

The roll of netting 51 which is to be located below the surface, can either be positioned in front of the frame 20 of the apparatus, with the net passing downwardly and beneath the roller 30, or, alternatively, and as illustrated, on a frame 12 on the front of the tractor 11, and passed beneath the tractor, and thus to the underside of the roller.

Either system is satisfactory.

It may be preferred that the roll of mesh is driven, so that the required quantity of mesh can be metered out as the tractor moves forwardly, so there is no stretching or distortion of the net.

The device can either be used on a natural surface, or a prepared surface, and we find that under both such applications, good application of the net is obtained.

It will be seen that as the net 50 is positively located a certain distance below the ground surface, even disturbances to the surface, as by wind moving some of the planted material before it has struck, or the growth of vegetation, will not cause the net to move.

The device of the invention can also be used if other materials need to be located beneath the ground surface. One particular application is the sowing of stolons, which can be fed with their lengths basically along the line of the axis of the roller in front of the roller, and they will be moved beneath the ground surface by the fluidisation process in a manner similar to that described for the netting.

The device is also useful for locating Netlon mesh elements in, say, a sand surface which has been prepared to receive washed sod.

These elements assist in the consolidation of the surface when the sod roots therein and are often used in such areas, as, for example, race tracks.

Whilst we have described one particular arrangement of device incorporating the invention and three applications, it will be appreciated that there can be other variations.

The claims defining the invention are as follows:

1. An apparatus to insert netting into the ground surface which includes a frame adapted to be connected to a prime mover and having a roller transverse to the direction of normal movement of the frame, the roller having spaced annular extensions thereabout, the roller limiting the depth of entry into the ground of the extensions to the radius of the annulus formed by the extensions, and vibration means associated with the roller which caused the roller to vibrate, the extensions being capable of effectively fluidising the ground surface so that the netting fed to the underside of the roller can be located in or under the ground surface by pressure from the extensions while the ground is fluidised.

2. An apparatus as claimed in claim 1 wherein the frame has means whereby it is attachable to a draw bar of a prime mover.

3. An apparatus as claimed in claim 1 wherein the roller is mounted for rotation in the frame and is driven by contact with the ground.

4. An apparatus as claimed in claim 1 wherein the vibration means comprises an eccentric mass mounted for rotation on the frame.

5. An apparatus as claimed in claim 4 wherein the mass is located on a shaft generally centrally of, and transverse to the roller which shaft is rotatably mounted on the frame.

6. An apparatus as claimed in claim 5 in which the shaft is rotated by a power take off of the prime mover.

7. A method of inserting a mesh into the ground surface comprising passing the mesh beneath a roller transverse to the direction of normal movement of a prime mover, the roller having spaced annular extensions thereabout, the roller limiting the depth of entry into the ground of the extensions to the radius of the annulus formed by the extensions, vibrating the roller to cause the extensions to effectively fluidise the ground surface so that material fed beneath the roller is located in or under the ground surface by downward pressure from the extensions while the ground is fluidised.

8. A method as claimed in claim 7 wherein the material so be fed is netting which is passed in a sheet beneath the roller.

9. A method as claimed in claim 7 wherein the material to be fed comprise small mesh elements which are fed to the ground ahead of the roller and are forced into the ground surface by the roller.

10. A method as claimed in claim 7 wherein the material to be fed comprises stolons which are to be located in the ground surface and which are fed to the ground ahead of the roller and are forced into the ground surface by the roller.

11. An assembly for inserting netting into a ground surface, comprising:

an apparatus including a frame adapted to be connected to a prime mover and having a roller transverse to the direction of normal movement of the frame, the roller having spaced annular extensions thereabout, the roller limiting the depth of entry into the ground of the extensions to the radius of the annulus formed by the extensions, said apparatus further including vibration means associated with the roller causing the roller to vibrate, the extensions being capable of effectively fluidizing the ground surface so that the netting fed to the underside of the roller can be located in or under the ground surface by pressure from the extensions while the ground is fluidized;

a prime mover having said apparatus mounted on a rear portion thereof; and, material delivery means located on said prime mover, said delivery means being capable of delivering a sheet of material to the ground surface ahead of said roller, said sheet of material being passable to the underside of said roller of said apparatus.

12. An assembly as claimed in claim 11 wherein the delivery means is a roll feeder located transverse to the direction of movement of the prime mover at the front of the prime mover whereby material from a roll is deliverable to the ground surface in front of a set of road wheels of the prime mover and which is passable beneath the prime mover to the underside of the transverse roller of the apparatus.

13. An assembly as claimed in claim 12 wherein the roll feeder of the delivery means is driven.

\* \* \* \* \*